United States Patent
Wolf

(10) Patent No.: US 6,743,012 B2
(45) Date of Patent: Jun. 1, 2004

(54) HEATER APPARATUS FOR A MOTOR VEHICLE

(75) Inventor: Felix Wolf, Augsburg (DE)

(73) Assignee: Webasto Thermosysteme International GmbH, Stockdorf (DE)

(*) Notice: Subject to any disclaimer, the term of this patent is extended or adjusted under 35 U.S.C. 154(b) by 109 days.

(21) Appl. No.: 10/023,486

(22) Filed: Dec. 20, 2001

(65) Prior Publication Data

US 2002/0117551 A1 Aug. 29, 2002

(30) Foreign Application Priority Data

Dec. 20, 2000 (DE) .......................... 100 63 922

(51) Int. Cl.[7] ............................... F23N 5/00
(52) U.S. Cl. .................... 431/353; 431/77; 237/12.3 C; 237/12.3 A; 165/41
(58) Field of Search ............................ 431/353, 77, 83; 165/41, 42; 237/12.3 C, 12.3 A

(56) References Cited

U.S. PATENT DOCUMENTS

| | | | | |
|---|---|---|---|---|
| 4,010,895 A | * | 3/1977 | Kofink et al. .......... | 237/12.3 C |
| 4,018,380 A | * | 4/1977 | Baier ..................... | 237/12.3 C |
| 4,860,951 A | * | 8/1989 | Waas ....................... | 237/2 A |
| 5,232,153 A | * | 8/1993 | Mohring et al. ........ | 237/12.3 C |
| 5,788,148 A | * | 8/1998 | Burner et al. ............... | 237/2 A |
| 6,006,997 A | * | 12/1999 | Pfister et al. ............... | 237/2 A |
| 6,540,150 B1 | * | 4/2003 | Eberspach et al. ..... | 237/12.3 C |

FOREIGN PATENT DOCUMENTS

| | | |
|---|---|---|
| DE | 35 17 954 A1 | 11/1986 |
| DE | 43 11 080 C1 | 3/1994 |
| DE | 44 33 210 A1 | 3/1996 |
| DE | 44 47 286 A1 | 7/1996 |
| DE | 198 02 906 A1 | 7/1999 |

* cited by examiner

*Primary Examiner*—Alfred Basichas
(74) *Attorney, Agent, or Firm*—Nixon Peabody LLP; David S. Safran

(57) ABSTRACT

A heating apparatus for a motor vehicle including a heat exchanger having a wall for separating a heated exhaust gas from a heat exchange medium, a conveyor mechanism for conveying the heat exchange medium along the wall, and a protective mechanism for protecting the heater against overheating. The protective mechanism determines the mass flow of the heat exchange medium delivered by the conveyor mechanism when the heater is actuated so that the danger of overheating the heater is reliably detected when the delivery of the heat exchange medium is dammed.

13 Claims, 2 Drawing Sheets

HEATER APPARATUS FOR A MOTOR VEHICLE

BACKGROUND OF THE INVENTION

1. Field of the Invention

The invention is directed generally to a heater apparatus, such as an auxiliary heater for a motor vehicle including one wall of a heat exchanger for separating a heated flammable gas or exhaust gas from a heat exchange medium, a conveyor mechanism for conveying the heat exchange medium along the wall, and a protective mechanism for protecting the heater from overheating. The invention further relates to a process for operating such a heater including the use of a hot-wire anemometer for measuring the hot air mass flow in the heater.

2. Description of the Related Art

Heater apparatus which are used as air heaters for heating hot air in a passenger compartment of a motor vehicle use fresh air and/or circulating air from the passenger compartment as the heat exchange medium. The hot air flow from the heat exchange medium absorbs the heat energy released by the heated exhaust gas to the wall of a heat exchanger and delivers the heat to the passenger compartment. When a passenger closes a flap or the exit openings of the passenger compartment heating system in order to limit the heat output from the heater, the hot air flow from the heater is reduced such that the heat exchange medium can no longer dissipate the heat energy of the flammable gas. Such a case is commonly referred to as "damming." In such a case, the temperature of the heat exchanger wall increases quickly, and results in the wall becoming leaky and can burn through. If this occurs, there is no longer separation between the exhaust gas and the heat exchange medium, and, in extreme cases, the exhaust can reach the passenger compartment.

In order to reliably prevent the dangerous mixing of the exhaust gas and the hot air flow, attempts have been, in the case of damming of the heater on the hot air outlet side, to promptly and reliably detect the danger of overheating of the wall of the heat exchanger, in order to then turn down or turn off the heater. Published German Patent Application DE 35 17 954 A1 discloses a generic auxiliary motor vehicle heater with a heat exchanger through which a heat exchange medium flows. In order to protect the heater from overheating, two sensors for sensing temperature are provided at the inlet and the outlet of the heat exchanger, the sensors being interconnected for monitoring of the operating state of the heater. The arrangement of two temperature sensors is, however, expensive and maintenance-intensive.

German Patent Publication DE 43 11 080 C1 discloses a motor vehicle heater which is independent of the engine and includes a flame monitor and one temperature sensor adjoining the wall of a heat exchanger for protecting the heat from overheating. Published German Patent Application DE 44 33 210 A1 discloses an auxiliary motor vehicle heater with a heat exchanger in which a temperature sensor is mounted between the combustion chamber and the exit opening of the heat exchange medium such that the sensor is used both as a mechanism protecting against overheating and as a flame monitor.

Temperature sensors for these applications generally have a resistance which can changed depending on temperature, for example, with a PTC characteristic. One disadvantage associated with this is that the shut-off of a PTC temperature sensor is comparatively slow and can only take place at a temperature above the full load temperature of the wall. For example, a full load temperature of 220° C. is conventional, while a shutoff temperature is typically 250° C. Therefore, under certain circumstances, the wall is heavily thermally loaded so that it must have a high wall thickness and other complex structural measures are necessary. Furthermore, to achieve the shutoff temperature, fuel is additionally consumed, with which the efficiency of the heater deteriorates.

Published German Patent Application DE 198 02 906 A1 discloses a fuel-operated air heater for motor vehicles with a burner and a heat exchanger by which hot air serves as the heat exchange medium and is conveyed by a fan, and flame monitor and an overheating sensor on the burner. The overheating sensor is an unencapsulated hot air temperature sensor, i.e., the sensor is located in the hot air flow without contact with the wall, especially in the area of the heat exchanger near the fan. Under certain circumstances, the measurement of the hot air temperature is too slow to reliably preclude overheating of the wall of the heat exchanger. This is due to the fact that when the hot air delivery is dammed, the temperature of the hot air rises very quickly and directly on the wall, but the temperature of the hot air rises more slowly farther away from the wall, for example at the site of the hot air temperature sensor.

Published German Patent Application DE 44 47 286 A1 discloses a motor vehicle heater with a burner (which is supplied by a fuel metering pump) and a combustion air fan. Depending upon the delivered amount of fuel, in order to achieve optimum combustion in the burner, a theoretical combustion air mass flow is determined and then compared to the actual combustion air mass flow. The speed of the combustion air fan is adjusted such that the actual value corresponds to the theoretical value. A combustion air mass flowmeter such as a hot-wire anemometer is placed in the combustion air channel in order to determine the actual combustion air mass flow. These combustion air mass flowmeters are known and are used in the control of combustion in the intake lines of internal combustion engines.

SUMMARY OF THE INVENTION

The object of the invention is to improve a heater of the initially-mentioned type such that the aforementioned disadvantages are surmounted, and especially, the danger of overheating the heater is recognized more reliably when the heat exchange medium delivery is dammed.

This object is achieved in accordance with the invention in that the protective mechanism of a heater of the initially-mentioned type is provided to determine during operation the mass flow of the heat exchange medium delivered by the conveyor mechanism.

The object is furthermore achieved with a process for controlling one such heater in which the protective mechanism, when the heater is activated, determines the mass flow of the heat exchange medium delivered by the conveyor mechanism, then compares the mass flow to the theoretical mass flow of the heat exchange medium stored in the protection mechanism, and at a difference between the current mass flow of the heat exchange medium and the theoretical mass flow of the heat exchange medium which indicates the danger of overheating the heat exchanger, limits the production of heated flammable gas in the heater.

The essence of the invention is that in order to detect the danger of overheating of the heat exchanger, the temperatures are not determined, as is the case in the related art which measures the temperature of the wall of the heat exchanger or the hot air as the heat exchange medium, but another physical quantity, specifically, the mass flow of the heat exchange medium, is determined. When the heat exchange medium inlet or the heat exchange medium outlet is dammed, the conveyor mechanism does not deliver the heat exchange medium in a sufficiently large amount through the heat exchanger, so that the mass flow of the heat exchange medium becomes zero or almost zero. This reduction in mass flow of the heat exchange medium is detected in accordance with the invention by the protective mechanism, and thus, the danger of overheating the heater is detected. The reduction of mass flow of the heat exchange medium occurs immediately upon damming so that the danger of overheating is detected without a skew. The heater in accordance with the invention can, therefore, be turned down or off especially quickly.

Another advantage of the invention is that the wall of the heat exchanger need not be heated beyond the full load temperature. The danger of damage to the wall or other components of the heater is, therefore, eliminated and additional fuel consumption is prevented. In addition, in the heater in accordance with the invention, the protection mechanism immediately and reliably detects failure of the conveyor for the heat exchange medium.

In one advantageous embodiment of the invention, the protective mechanism has a heat exchange medium mass flowmeter which is located in the hot air delivery line. A heat exchange medium mass flowmeter can be economically ordered as a standard component and is offered in various embodiments so that it can be easily incorporated electrically into an existing heater and its control. The heat exchange medium mass flowmeter is located advantageously in the conveyor line between the conveyor mechanism and the heat exchanger. In this section of the conveyor line, the heat exchange medium mass flowmeter can be installed easily since it does not require integration into the heat exchanger. The reaction time of the heat exchange medium mass flowmeter is especially short when it is located on the pressure side of the conveyor mechanism.

Another embodiment of the invention is that the heater includes a burner and the protective mechanism has a control device which is operationally coupled to the burner and the heat exchange medium mass flowmeter. The control device is provided to compare the acquired actual heat exchange medium mass flow to a theoretical heat exchange medium mass flow, and subsequently controls the burner depending upon the comparison, for example, by reducing output from burner or deactivating the burner. The proposed control is based solely on an actual-theoretical comparison, and, can therefore, be done by the control which is present in conventional heaters.

The function of the protective mechanism in accordance with the invention is expanded almost without additional cost by providing the control device with a nonvolatile storage in which, for the theoretical heat exchange medium mass flow, at least one tolerance range is filed which is assigned to one load state of the heater, especially a full load or at least a partial load. Preferably, the theoretical heat exchange medium mass flow values are stored for each load state of the heater. As long as the measured mass flow of the heat exchange medium and thus the delivery performance of the conveyor means is above the lower boundary of the tolerance range, sufficient flow of the heat exchange medium mass through the heat exchanger is ensured. As previously explained, the heat exchanger is protected against overheating. The upper boundary of the tolerance range ensures that the mass flow of the heat exchange medium is not unduly large. This could be the case when control of the conveyor mechanism or of the burner of the heater is defective or the load states of the burner and conveyor mechanism of the heat exchange medium are poorly tuned to one another. If during a certain unit of time relative to the load state of the burner, too much heat exchange medium mass is conveyed by the heat exchange medium, the heat exchange medium mass cannot be heated to the required extent and therefore does not yield the desired heat output in the passenger compartment.

In another embodiment of the invention which is especially well suited for heaters of motor vehicles, the heat exchange medium is air and the heat exchange medium mass flowmeter is a hot-wire anemometer. Mass flowmeters are already used in motor vehicles for controlling combustion in intake lines of internal combustion engines, and, therefore, are especially economical with respect to procurement, implementation and maintenance. Preferably, the hot-wire anemometer is coupled advantageously to a control device of a conventional auxiliary heater for motor vehicles by providing the hot-wire anemometer with a hot wire, such as a PTC hot wire. In operation of the heater, a constant electrical voltage is applied to the PTC hot wire and is cooled by the hot air mass flow so that its temperature, and thus, its resistance change. In this way, the intensity of a current flowing through the hot wire is a measure of the heat exchange medium mass flow.

DETAILED DESCRIPTION OF THE INVENTION

Figure 1:
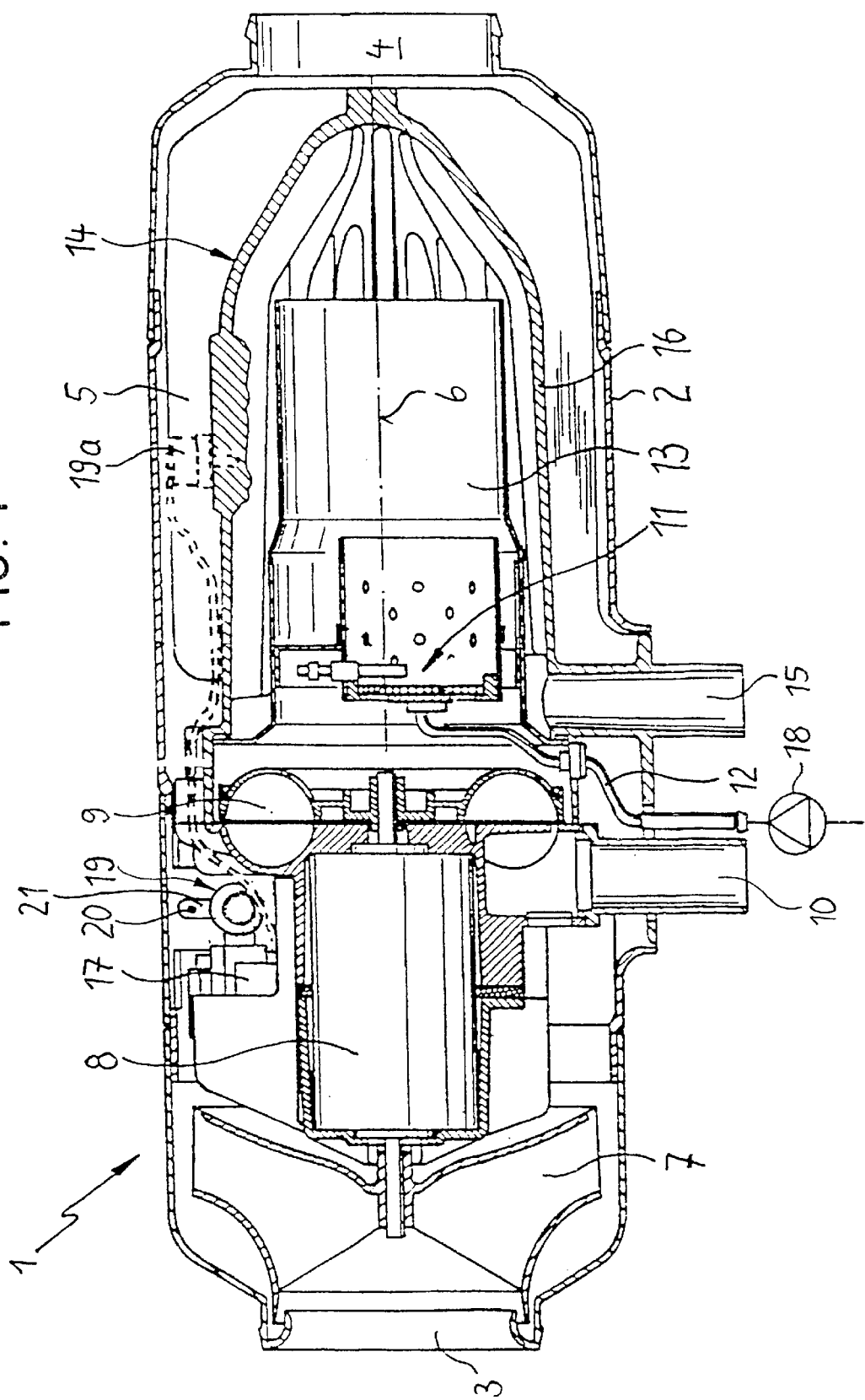
FIG. 1 shows a longitudinal cross section of an air heater in accordance with the invention.

The heater 1 shown in FIG. 1 is made as an air heater for a motor vehicle. The heat exchange medium is air which is generally received from the environment of the motor vehicle, and, after heating, is delivered to the passenger compartment of the motor vehicle. A tubular housing 2 on the left end face of the heater 1 has a hot air inlet opening 3, and, on the opposite right end face, a hot air exit opening 4. The housing 2 forms a hot air channel 5, in the middle area of which there are the important components of the heater 1 for delivering and heating the hot air following one another on the longitudinal axis 6.

Near the hot air inlet opening 3 is a hot air fan 7 which serves as a means for conveying a heat exchange medium such as hot air, and which is driven by an electric motor 8 which is located nearby. The electric motor 8 also drives a combustion air fan 9 which is located next to it, roughly in the center of the heater 1. The combustion air fan 9 intakes combustion air and delivers the air to the burner 11 by way of a combustion air line 10 which penetrates the housing 2. The burner 11 is also supplied with liquid fuel by a fuel line 12, the liquid fuel serving to vaporize in the burner 11 and mix with the combustion air. The mixture burns in a combustion chamber 13 which is surrounded by the heat exchanger 14. The resulting exhaust gas travels through the exhaust line 15 out of the housing 2. When burned, the mixture releases heat energy to a wall 16 of the heat exchanger 14 which separates the combustion chamber 13 from the aforementioned hot air channel 5. The hot air which is delivered by the hot air channel 5 for its part is heated by the wall 16.

In the heater 1, in the area of the electric motor 8, a control device 17 is furthermore mounted which actuates, via lines (not shown), in particular, the electric motor 8 and a fuel metering pump 18 which is located outside the housing 2. In conventional heaters, a temperature sensor is mounted on the wall 16 which serves as a means for protecting against the overheating of the heat exchanger 14. One such conventional temperature sensor 19a is shown by broken lines in FIG. 1. The heater 1 which is shown on the other hand for protection against overheating has a hot-wire anemometer 19 which is located in the hot air channel 5 radially between the electric motor 8 and the housing 2. The core of the hot-wire anemometer 19 is a hot wire 20 which extends, freely accessible to the hot air mass flow, pointed tangentially to the longitudinal axis in the hot air channel 5. The two ends of the hot wire 20 are each attached to a holder 21 which is mounted outside on the control device 17. Alternatively, the holder 21 can be made in one piece with the housing of the control device 17. Each end of the hot wire 20 is connected by a line (not shown) to a control circuit (not shown) in the control device 17.

By mounting the hot-wire anemometer 19 directly on the control device 17, incorrect installation is precluded and electrical cable need not be laid. The hot-wire anemometer 19 can, alternatively, be mounted in the hot air channel 5 away from the control device 17. Then attachment to the side of the electric motor 8, where there is enough installation space available, diametrically opposite the control device 17 is advantageous. In this case, the hot-wire anemometer 19 in the flow direction of the hot air is also located directly behind the hot air fan 7 where fluctuations in the delivery amount of the hot air fan 7 can be detected with special precision and the hot-wire anemometer 19 is located in the area of the heater 1 which is "cooled" by the delivered hot air so that the heater is not exposed to a thermal load and the mass flow measurement is not adulterated by thermal effects.

In operation of the heater 1, the hot-wire anemometer 19 determines the hot air mass flow delivered by the hot air fan 7. The value of the current mass flow is compared in the control device 17 to a tolerance range for the theoretical mass flow and the burner 11 is adjusted if necessary. In normal operation of the heater 1, the value of the delivered mass flow is within a predetermined tolerance range, depending upon the load state. If at this point, the hot air outlet opening 4 is dammed, because a passenger closes the heating in the passenger compartment of the motor vehicle, the delivered hot air mass flow is reduced abruptly. This reduction of the mass flow is immediately detected by the hot-wire anemometer 19 without thermally induced delays or deviations in the measurement occurring. The control device 17 can therefore turn down the burner 11 very quickly.

Figure 2:
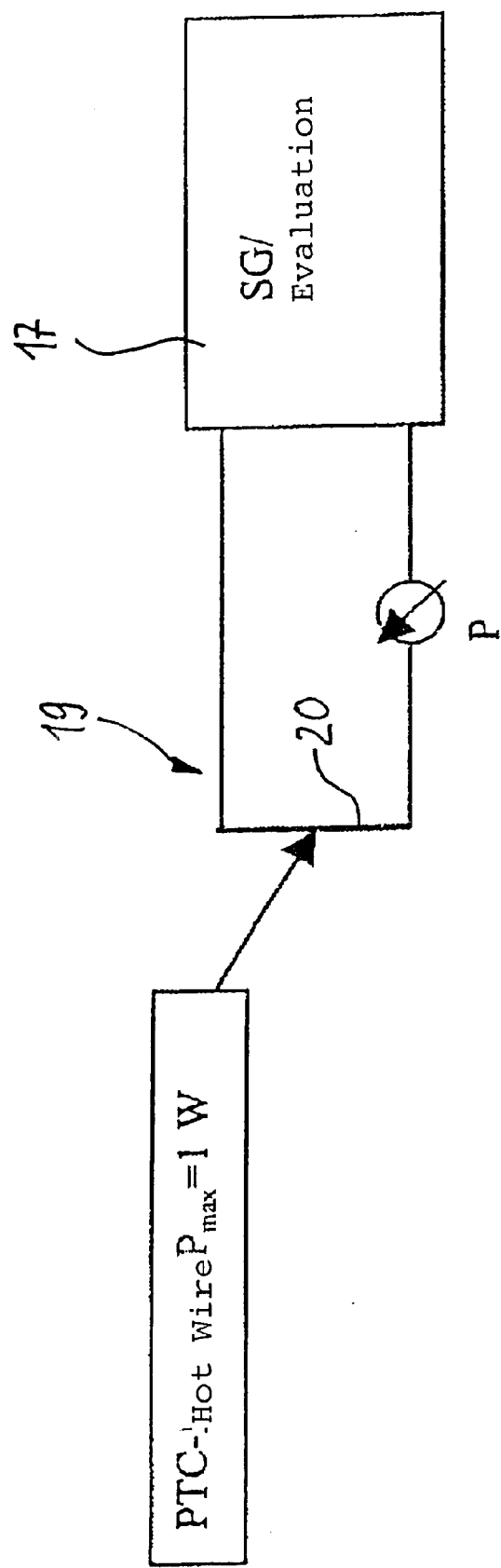
FIG. 2 shows a schematic of a hot-wire anemometer used in accordance with the air heater of FIG. 1.

FIG. 2 illustrates the function of the hot-wire anemometer 19 in interplay with the control device 17. The hot wire 20 of the hot-wire anemometer 19 with one end connected to the control device by one line at a time is made of a PTC material with a resistance which is dependent on the temperature of the material. In the operation of the heater 1, on the two ends of the hot wire 20 a constant voltage U is applied so that electrical current with intensity I1 flows. The hot wire 20 is heated by the current flow and a certain resistance R1 is established. If at this point, the hot air fan 7 produces a hot air mass flow, this mass flow cools the hot wire 20. The resistance of the hot wire 20 would, thus, drop to R2<R1. This tendency is, however, counteracted by a current with a greater intensity I2 flowing. The magnitude of this current intensity I2 is thus a measure of the hot air mass flow. If at this point, the aforementioned case arises that the hot air exit opening 4 is dammed, the hot air mass flow on the hot-wire anemometer 19 is slowed down or stopped. The hot wire 20 is, therefore, less cooled or not cooled at all, assumes a higher temperature, and its resistance rises. Thus, in turn the intensity 13 of the current through the hot wire 20 decreases; this is detected by the control device 17 and is compared to the corresponding limits of the tolerance range which is assigned to the instantaneous load range of the heater 1. If a deviation is determined which indicates the danger of overheating of the heat exchanger, the control device 17 turns down the burner 11 accordingly.

What is claimed is:

1. A heating apparatus for a motor vehicle comprising:
    a heat exchanger, said heat exchanger having a wall for separating a heated exhaust gas from a heat exchange medium;
    conveyor means for conveying the heat exchange medium along said wall;
    a burner for producing a heated gas mixture which heats said wall; and
    protective means for protecting said heating apparatus against overheating, said protective means including a heat exchange medium mass flowmeter positioned in a channel in which the heat exchange medium flows;
    wherein said protective means has a control device which is operationally coupled to said burner and said heat exchange medium mass flowmeter, said control device controlling the burner based upon a comparison of an acquired actual heat exchange medium mass flow to a theoretical heat exchange medium mass flow.

2. Apparatus as claimed in claim 1, wherein said heat exchange medium mass flowmeter is located in said channel between said conveyor means and said heat exchanger.

3. Apparatus as claimed in claim 2, wherein the heat exchange medium mass flowmeter is located on a pressure side of said conveyor means.

4. Apparatus as claimed in claim 1, wherein said control device has a nonvolatile storage area in which at least one tolerance range is filed for the theoretical heat exchange medium mass flow, said tolerance range being assigned to one load state of said heating apparatus and a separate value for the theoretical heat exchange medium mass flow being assigned to each load state of said heating apparatus.

5. Apparatus as claimed in claim 1, wherein the heat exchange medium mass flowmeter is located on a pressure side of said conveyor means.

6. Apparatus as claimed in claim 5, further comprising a burner for producing a heated gas mixture which heats said wall.

7. Apparatus as claimed in claim 6, wherein said protective means has a control device which is operationally coupled to said burner and said heat exchange medium mass flowmeter, said control device controlling the burner based upon a comparison of an acquired actual heat exchange medium mass flow to a theoretical heat exchange medium mass flow.

8. Apparatus as claimed in claim 7, wherein said control device has a nonvolatile storage area in which at least one tolerance range is filed for the theoretical heat exchange medium mass flow, said tolerance range being assigned to one load state of said heating apparatus and a separate value for the theoretical heat exchange medium mass flow being assigned to each load state of said heating apparatus.

9. Apparatus as claimed in claim 8, wherein the heat exchange medium is air and the heater exchange medium mass flowmeter is a hot-wire anemometer.

10. Apparatus as claimed in claim 9, wherein said hot-wire anemometer has a PTC hot wire to which a constant electrical voltage is applied and which is cooled by the heat exchange medium mass flow during operation of said heating apparatus, said PTC hot wire having a resistance that serves as a measure of the heat exchange medium mass flow.

11. Process for controlling a heater of a motor vehicle having a heat exchanger with a wall for separating a heated exhaust gas from a heat exchange medium, conveyor means for conveying the heat exchange medium along said wall, and protective means for protecting said heating apparatus against overheating, the process comprising the steps of:

determining the mass flow of the heat exchange medium delivered by the conveyor means;

comparing an actual heat exchange medium mass flow to a theoretical heat exchange medium mass flow; and limiting the generation of the heated flammable gas when a difference between the current mass flow of the heat exchange medium and the theoretical mass flow of the heat exchange medium indicates overheating of the heat exchanger.

12. A heating apparatus for a motor vehicle comprising:

a heat exchanger, said heat exchanger having a wall for separating a heated exhaust gas from a heat exchange medium;

conveyor means for conveying the heat exchange medium along said wall; and protective means for protecting said heating apparatus against overheating, said protective means including a heat exchange medium mass flowmeter positioned in a channel in which the heat exchange medium flows;

wherein the heat exchange medium is air and the heater exchange medium mass flowmeter is a hot-wire anemometer.

13. Apparatus as claimed in claim 12, wherein said hot-wire anemometer has a PTC hot wire to which a constant electrical voltage is applied and which is cooled by the heat exchange medium mass flow during operation of said heating apparatus, said PTC hot wire having a resistance that serves as a measure of the heat exchange medium mass flow.

* * * * *